United States Patent
Jeong

[11] Patent Number: 5,945,050
[45] Date of Patent: Aug. 31, 1999

[54] METHOD OF FABRICATING A SINTERED OILLESS BEARING

[75] Inventor: Dae Hyun Jeong, Kyunggi-do, Rep. of Korea

[73] Assignee: Samsung Electro-Mechanics Co., Ltd., Suwon, Rep. of Korea

[21] Appl. No.: 08/976,543

[22] Filed: Nov. 24, 1997

[30] Foreign Application Priority Data

Jun. 24, 1997 [KR] Rep. of Korea ..................... 97-26808

[51] Int. Cl.[6] ............................ F16C 33/10; F16C 33/14; B22F 3/24
[52] U.S. Cl. ......................... 264/119; 264/120; 264/628; 419/2; 419/27; 419/38
[58] Field of Search ................................... 264/119, 628, 264/120; 419/2, 27, 38

[56] References Cited

U.S. PATENT DOCUMENTS

| | | | |
|---|---|---|---|
| 4,059,879 | 11/1977 | Chmura et al. | 419/2 |
| 4,534,922 | 8/1985 | Atkinson et al. | 264/119 |
| 4,774,749 | 10/1988 | Furumura | 419/38 |
| 5,030,396 | 7/1991 | Saita et al. | 264/44 |
| 5,043,123 | 8/1991 | Gormanns et al. | 419/38 |
| 5,045,262 | 9/1991 | Munk | 264/120 |
| 5,167,885 | 12/1992 | Rice et al. | 419/2 |
| 5,785,429 | 7/1998 | Jeong | 384/397 |

FOREIGN PATENT DOCUMENTS 5180229  7/1993  Japan.

*Primary Examiner*—Jan H. Silbaugh
*Assistant Examiner*—Dae Young Lee
*Attorney, Agent, or Firm*—Ladas & Parry

[57] ABSTRACT

A method for fabricating a sintered oilless bearing using a correcting rod having a projection correcting portion and a groove forming portion having outer diameters respectively identical to inner diameters of projections and grooves to be formed into the oilless bearing. An upper punch is inserted into the upper portion of the correcting rod for pressing the sintered oilless bearing to allow the inner periphery of the sintered oilless bearing to closely contact the groove forming portion and, simultaneously, fit into the projection forming portion. A lower punch is ascended from the lower portion of the correcting rod for separating the sintered oilless bearing from the correcting rod and to allow a portion of the inner periphery of the sintered oilless bearing inserted into the projection forming portion to match with the outer periphery of the projection correcting portion while being compressed, thereby exactly matching the concentricities of the projections and grooves of the sintered oilless bearing to make the kinetic pressure generating force consistent and improve a bearing force.

1 Claim, 5 Drawing Sheets

METHOD OF FABRICATING A SINTERED OILLESS BEARING

BACKGROUND OF THE INVENTION

1. Field of the Invention

The present invention relates to an apparatus for fabricating a sintered oilless bearing and method thereof, and more particularly to an apparatus for fabricating a sintered oilless bearing, wherein the sintered oilless bearing is corrected by means of a correcting rod shaped to be identical to projections and grooves formed along the inner periphery of the sintered oilless bearing for exactly match the concentricities of the projections and grooves to make a kinetic pressure generating force consistent and improve a bearing force.

2. Description of the Prior Art

A general sintered oilless bearing has disclosed in Japanese Laid-Open Patent No. hei 5-180229, which, as shown in FIG. 1, is formed such that sintered oilless bearing 1 is molded by forming a plurality of projections 2 and grooves 3 along the inner periphery thereof. Then, it is subjected to the sintering treatment to have porosity capable of absorbing oil. Under the sintered state, the oil is impregnated to push-fit bearing 1 into a housing which forms a motor. Also, once a correcting rod 4 is forcibly inserted into the inner periphery of bearing 1 during the push fit process to correct projections 2 to have a desired inner diameter, porous oil absorbing holes finely-formed in the inner surface of respective projections are clogged while the oil absorbing holes of grooves 3 are unblocked.

Upon inserting a shaft into the inner periphery of sintered oilless bearing 1 provided as above, the outer periphery of the shaft becomes in contact with respective projections 2. Thus, while the shaft is rotated at high speed, the oil is supplied into the oil absorbing holes of respective grooves 3 to generate the kinetic pressure between projections 2 and rotatably support the shaft.

The conventional sintered oilless bearing 1, however, involves contraction during the sintering process to differ the concentricities of projections 2 and grooves 3. That is, when performing the sintering, there is no separate architecture for gripping the positions of them to differ the concentricities of respective projections 2 and grooves 3 with the consequence of varying pressure distribution throughout respective grooves 3 to make the generation of the kinetic pressure inconsistent.

SUMMARY OF THE INVENTION

The present invention is devised to solve the foregoing problems of the prior art. Therefore, it is an object of the present invention to provide an apparatus for fabricating a sintered oilless bearing and method thereof, wherein the outer periphery of a correcting rod is formed to have the outer diameter identical to the inner diameters of projections and grooves of the sintered oilless bearing to insert the sintered bearing into the correcting rod and then push fit it by a press for correcting the projections and grooves by the correcting rod, so that the concentricities of the projections and grooves of the sintered oilless bearing are precisely matched to make the kinetic pressure generating force consistent and improve a bearing force.

To achieve the above object of the present invention, an apparatus for fabricating a sintered oilless bearing includes a correcting rod which is formed with a projection correcting portion having an outer diameter identical to an inner diameter of projections to be formed along an inner periphery of the sintered oilless bearing, a groove forming portion provided to the lower side of the projection correcting portion shaped as having a concentric circle larger than the outer diameter of the projection correcting portion while having an outer diameter identical to an inner diameter of grooves to be formed along the inner periphery of the sintered oilless bearing, and projection forming portions radially provided from the groove forming portion throughout a portion of the lower side of the projection correcting portion while being formed to have a predetermined depth to have an outer diameter smaller than the outer diameter of the projection correcting portion. Also, an upper punch is inserted into the upper portion of the correcting rod for pressing the sintered oilless bearing to allow the inner periphery of the sintered oilless bearing to closely contact the groove forming portion and, simultaneously, fit into the projection forming portion. Additionally, a lower punch is inserted into the lower portion of the correcting rod for ascending the sintered oilless bearing to allow a portion of the inner periphery of the sintered oilless bearing inserted into the projection forming portion to match with the outer periphery of the projection correcting portion while being compressed.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
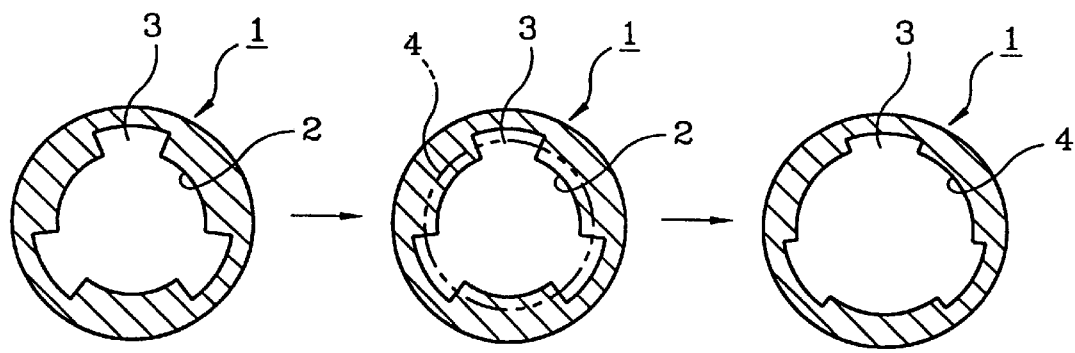
FIG. 1 is systematic diagrams showing a conventional method for fabricating a sintered oilless bearing.
Figure 2:
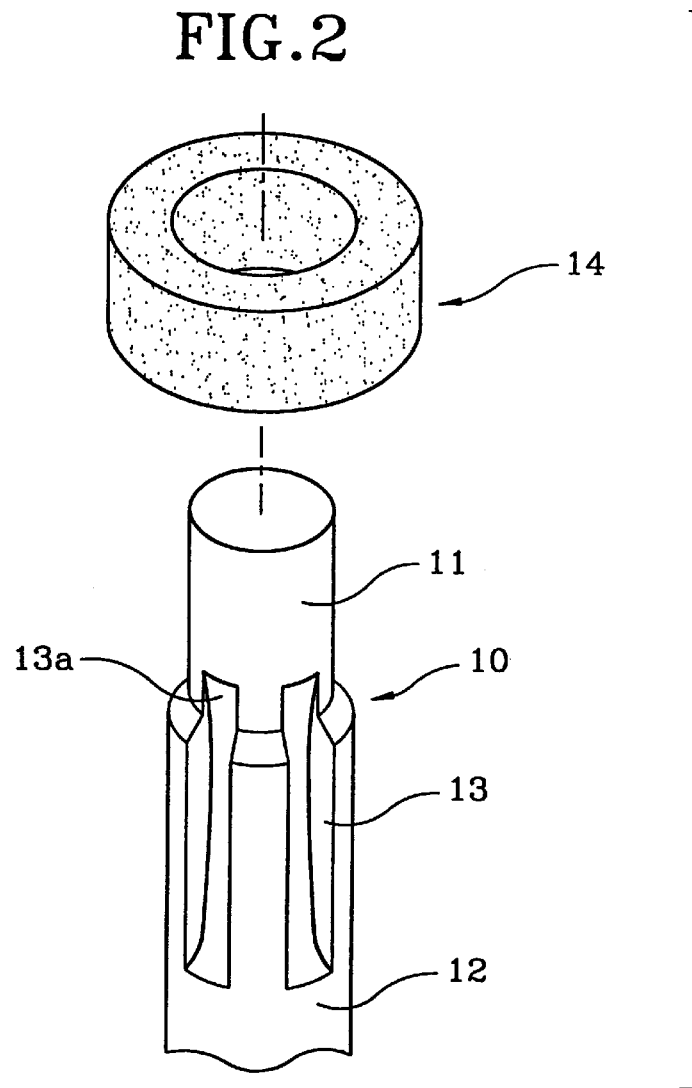
FIG. 2 is a perspective view partially showing an apparatus for fabricating a sintered oilless bearing according to the present invention.
Figure 3A:
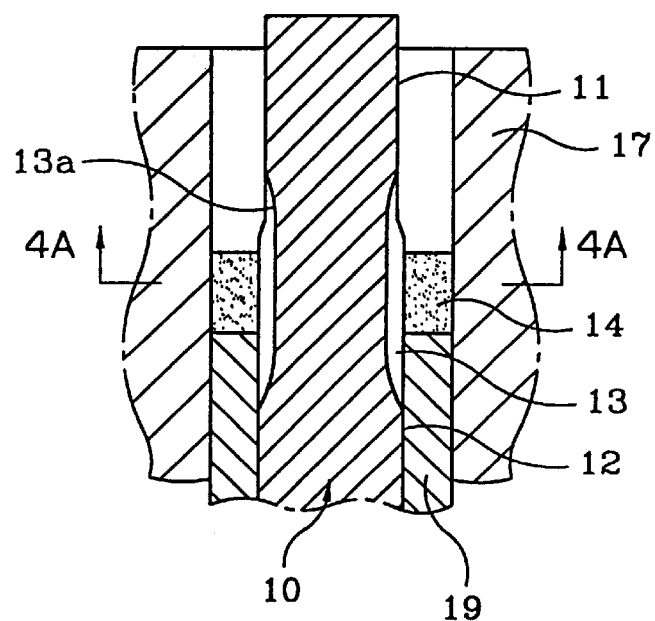
FIGS. 3A, 3B and 3C are sectional views showing the apparatus for fabricating the sintered oilless bearing according to the present invention.
Figure 3B:
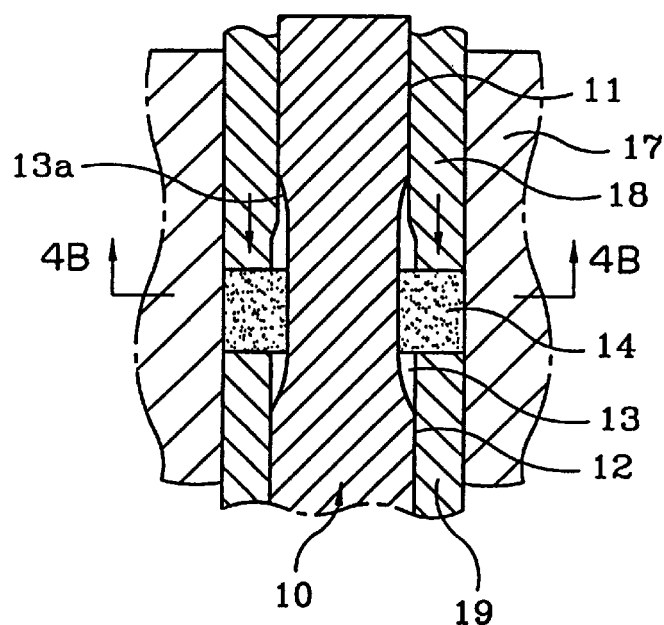
Figure 3C:
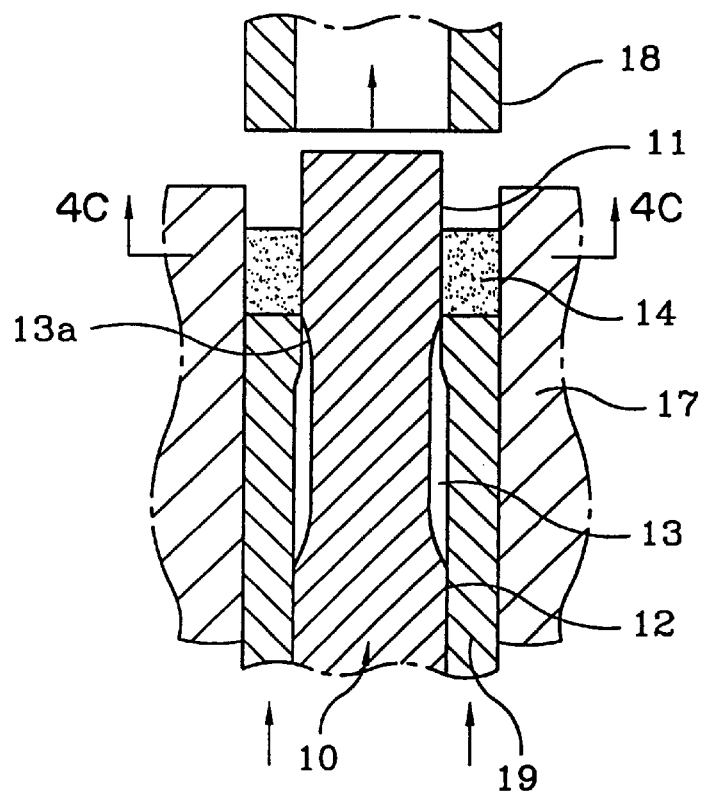
Figure 4A:
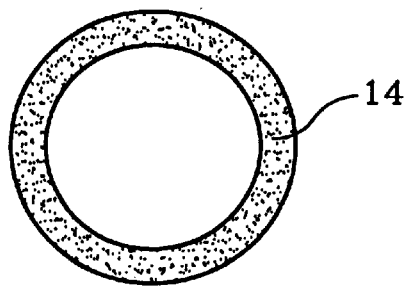
FIGS. 4A to 4E are sectional views showing a method for fabricating the sintered oilless bearing according to the present invention.
Figure 4B:
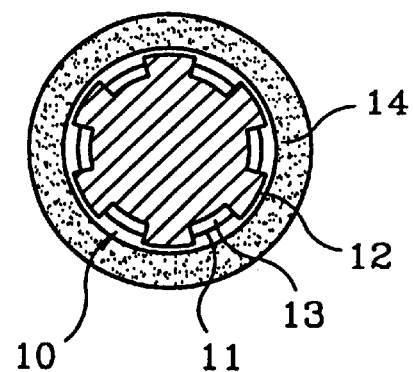
Figure 4C:
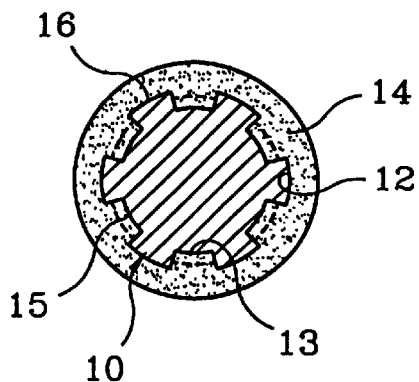
Figure 4D:
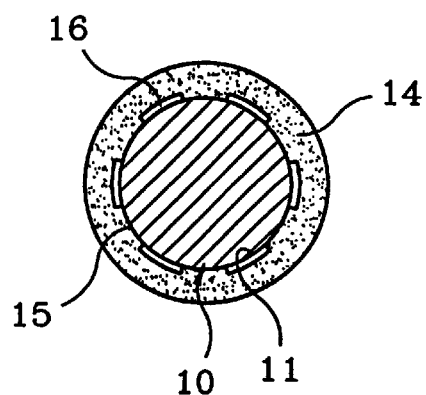
Figure 4E:
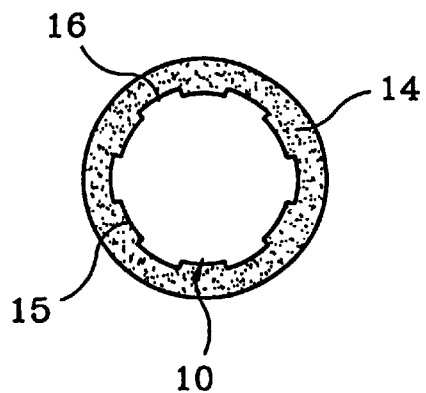

FIG. 2 is a perspective view partially showing an apparatus for fabricating a sintered oilless bearing according to the present invention, and FIGS. 3A, 3B and 3C are sectional views showing the apparatus for fabricating the sintered oilless bearing according to the present invention. Here, a correcting rod 10 is inserted with cylindrical sintered oilless bearing 14 which has been subjected to the sintering. Correcting rod 10 is formed with a projection correcting portion 11 at the upper portion thereof in the form of a cylindrical bar having an outer diameter identical to the inner diameter provided by plurality of projections 15 to be formed along the inner periphery of sintered oilless bearing 14. Also, a groove forming portion 12 is formed to the lower portion of projection correcting portion 11 in the form of a cylindrical bar, of which outer diameter is identical to the inner diameter provided by a plurality of grooves 16 to be formed along the inner periphery of sintered oilless bearing 14.

Additionally, correcting rod 10 is provided with a plurality of projection forming portions 13 in the radial direction. Projection forming portions 13 is lengthwisely formed along the axial direction in the form of indenting grooves so as to insertedly project from the inside of correcting rod 10 during the process of push-fitting sintered oilless bearing 14. The preceding ends of respective projection forming portions 13 respectively extend toward projection correcting portion 11, and the extending portions of projection forming portions 13 constitute slope portions 13a shaped as gentle arcs. A hollowed frame 17 is furnished to the outer periphery of correcting rod 10. Also, an upper punch 18 elevating at the upper portion and a lower punch 19 elevating at the lower portion are provided between frame 17 and correcting rod 10.

In the present invention formed as above, the outer diameter of projection correcting portion 11 formed to the outer periphery of correcting rod 10 is smaller than the outer diameter of groove forming portion 12, and a border portion of them is stepped. The difference of the outer diameters is the same as the difference of the inner diameters of projection 15 and groove 16 of sintered oilless bearing 14. Under this condition, cylindrical sintered oilless bearing 14 subjected to the sintering is fitted between correcting rod 10 and frame 17. Once sintered oilless bearing 14 afforded with the porosity during the sintering process is fitted into correcting rod 10, it is placed onto the upper portion of lower punch 19. Then, upper punch 18 descends to be disposed as shown in FIG. 3B, and sintered oilless bearing 14 becomes compressed. During the compressing process, the inner periphery of sintered oilless bearing 14 is in closely contact with groove forming portion 12 of correcting rod 10 and is partially inserted into projection forming portion 13. Furthermore, sintered oilless bearing 14 is compressed as much as not blocking the porous oil absorbing holes.

The inner periphery of sintered oilless bearing 14 closely in contact with groove forming portion 12 during the compressing process is formed as grooves 16 of sintered oilless bearing 14. At this time, the oil absorbing holes in the portion formed with grooves 16 are not clogged. Also, the portion inserted into projection forming portion 13 is formed as projections 15. After completing the compression, upper punch 18 is externally separated out of frame 17, and then lower punch 19 gradually ascends. Once lower punch 19 ascends as shown in FIG. 3C, sintered oilless bearing 14 is separated from correcting rod 10, and projections 15 inserted into projection forming portion 13 during the separating process is compressed again while passing through projection correcting portion 11. Along with the ascending of sintered oilless bearing 14, projections 15 are compressed while passing through slope portions 13a and the porous oil absorbing holes are clogged during the compressing process.

Once sintered oilless bearing 14 is completely separated from correcting rod 10, sintered oilless bearing 14 formed with projections 15 and grooves 16 along the inner periphery thereof is completed. Sintered oilless bearing 14 is sequentially compressed and processed by passing through groove forming portion 12, projection forming portion 13 and projection correcting portion 11 formed to correcting rod 10, so that the concentricities formed by the inner diameters of projections 15 and grooves 16 are precisely matched. Furthermore, during the fabricating process, the oil absorbing holes of grooves 16 are not clogged, but almost all oil absorbing holes of projections 15 are clogged. When sintered oilless bearing 14 is impregnated with the oil and push-fitted into a housing which forms a motor to support the shaft, the oil is supplied from grooves 16 during rotating the shaft and the kinetic pressure is generated at projections 15 to rotatably support the shaft. Also, the concentricities of grooves 16 and projections 15 are exactly matched to each other to make the kinetic pressure generating distribution consistent, thereby improving the rotating accuracy.

Figure 5:
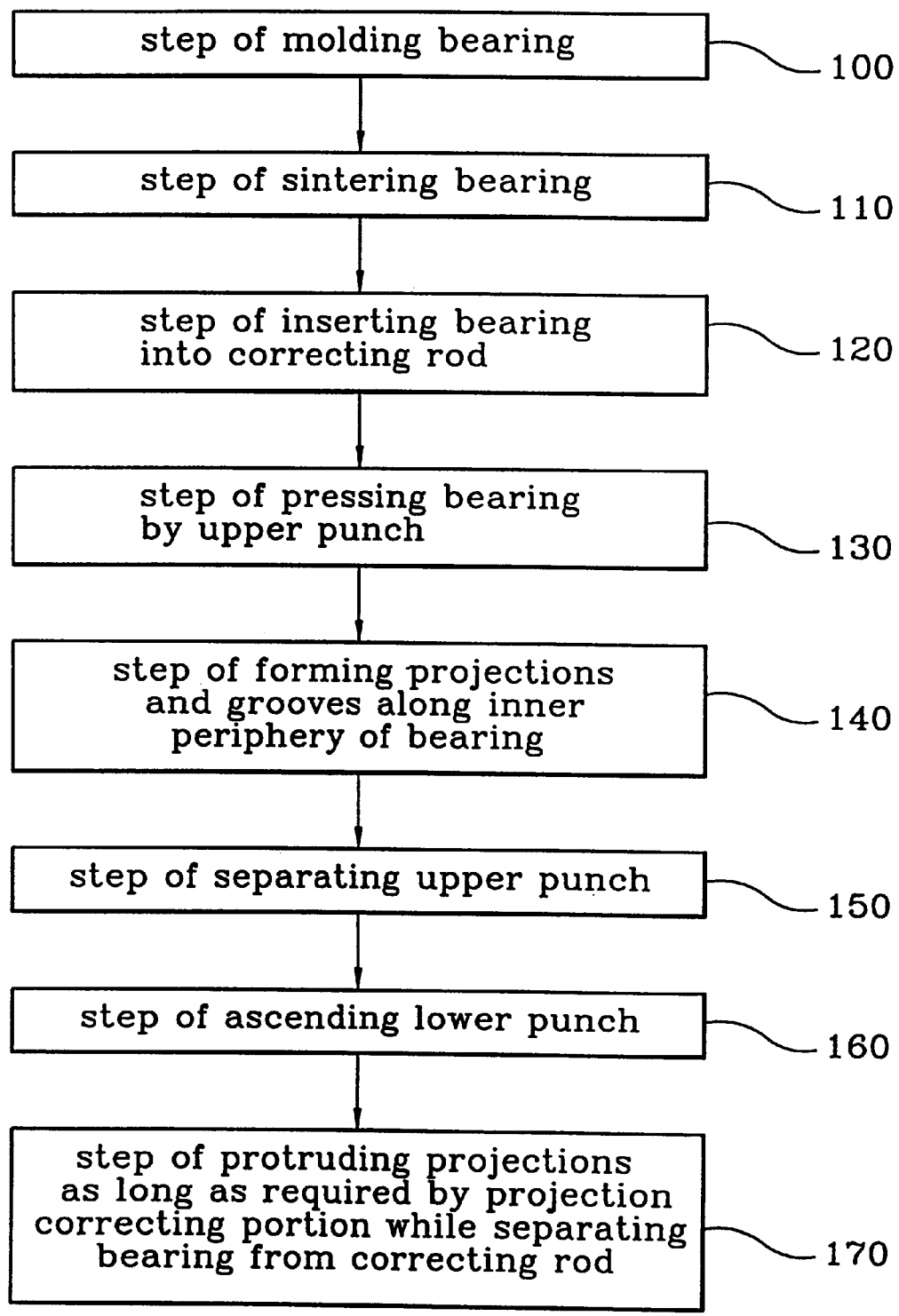
FIG. 5 is a flowchart showing the method for fabricating the sintered oilless bearing according to the present invention.

FIG. 5 is a flowchart showing the method for fabricating the sintered oilless bearing according to the present invention, in which sintered oilless bearing 14 is molded into the cylinder form in step 100, and molded sintered oilless bearing 14 is subjected to the sintering to form the fine oil absorbing holes in step 110. In step 120, sintered oilless bearing 14 having been subjected to the sintering is inserted into correcting rod 10. Then, sintered oilless bearing 14 is pressurized by means of upper punch 18 in step 130. In step 130 of pressurizing sintered oilless bearing 14, sintered oilless bearing 14 is compressed and the inner periphery thereof is in closely contact with the outer periphery of correcting rod 10. Also, sintered oilless bearing 14 closely contacts the outer periphery of groove forming portion 12 formed to correcting rod 10 in the closely contacting step to thereby automatically form grooves 16 and form projections 15 by projection forming portion 13 in step 140. During the step of forming grooves 16, the oil absorbing holes are not clogged.

After sintered oilless bearing 14 is compressed, upper punch 18 ascends to be separated from correcting rod 10 in step 150, and lower punch 19 ascends in step 160. While lower punch 19 ascends, sintered oilless bearing 14 is separated from correcting rod 10. At this time, projections 15 are compressed by projection correcting portion 11 formed to correcting rod 10 to protrude as long as required, in step 170. During the step of compressing projections 15 as long as required, the finely formed oil absorbing holes become clogged. Upon being subjected to the above-described steps, plurality of projections 15 and grooves 16 having the exactly matched concentricities are formed along the inner periphery of sintered oilless bearing 14.

In the present invention as described above, the sintered oilless bearing having been subjected to the sintering is inserted into the outer periphery of the correcting rod. Then, by pressing it by means of the upper punch, the inner periphery of the sintered oilless bearing becomes in closely contact with outer periphery of the correcting rod. Also, during the closely contacting process, it closely contacts with the groove forming portion formed along the outer periphery of the correcting rod to automatically set the inner diameter of the grooves. After setting the inner diameter of the grooves, the lower punch is utilized to separate the compressed sintered oilless bearing from the correcting rod. By doing so, the projections are compressed as long as required by the projection correcting portion to lead to automatically set the inner diameter of the projections. As a result, the inner diameters of the projections and grooves of the sintered oilless bearing are determined by the correcting rod during the fabricating process. Therefore, the concentricities of them are exactly matched to make the oil pressure generated at respective grooves consistent during rotating the shaft while the shaft is rotated at high speed by being inserted into the sintered oilless bearing. Consequently, the present invention is effective in making the kinetic pressure at respective projections consistent, and improving the precision in rotatable support of the shaft.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A method for fabricating a sintered oilless bearing comprising the steps of:

molding said sintered oilless bearing in the form of a hollowed cylinder;

sintering said molded sintered oilless bearing to provide oil absorbing holes;

inserting said sintered oilless bearing onto a correcting rod having a projection correcting portion and a groove forming portion having outer diameters respectively identical to inner diameters of projections and grooves to be formed into said sintered oilless bearing;

pressing said sintered oilless bearing by means of an upper punch for allowing an inner periphery of said sintered oilless bearing to closely contact said groove forming portion and projection forming portion; closely contacting said inner periphery of said sintered oilless bearing with said groove forming portion and said projection forming portion forming said grooves and said projections;

separating said upper punch from said correcting rod after pressing said sintered oilless bearing;

ascending a lower punch to separate the pressed sintered oilless bearing from said correcting rod; and compressing said projections during said step of separating the pressed sintered oilless bearing from said correcting rod to determine an inner diameter of said projections, and clogging said oil absorbing holes in said projections to finally complete said sintered oilless bearing.

* * * * *